Sept. 5, 1950   C. BRUMMER   2,521,337
STATIC ELECTRICITY GROUNDING DEVICE FOR VEHICLES
Filed Aug. 13, 1948

INVENTOR.
Charles Brummer
BY
McMorrow, Berman & Davidson
ATTORNEYS

Patented Sept. 5, 1950

2,521,337

UNITED STATES PATENT OFFICE 2,521,337

STATIC ELECTRICITY GROUNDING DEVICE FOR VEHICLES

Charles Brummer, Shelbyville, Ind.

Application August 13, 1948, Serial No. 44,072

2 Claims. (Cl. 175—264)

My invention relates to means for grounding static electricity accumulated in vehicles, particularly rubber-tired vehicles, while the same are traveling over a ground-providing surface. As is well known, the rubber tires provide substantially good insulators, whereby the static electricity accumulated in such vehicles is prevented from grounding. Such accumulations of static electricity constitute a fire hazard and also may result in unpleasant shocks when entering or leaving a vehicle. Such devices are known, but generally comprise chains or the like dangling from a vehicle which are in constant contact with the grounding surface and which make considerable noise as the vehicle moves along the road. Also, such frequent contact with the road quickly wears away the terminal portions of these devices, whereby constant replacement is necessary.

With the foregoing in view, it is an object of my invention to provide an improved static electricity grounding device for vehicles.

A further object is to provide an improved static electricity grounding device for vehicles which includes means actuated by the wind created by the travel of the vehicle at or above normal speed, which means is effective to elevate the grounding device and maintain the same out of contact with the grounding surface until such time as the vehicle speed goes below a selected normal speed.

A further object is to provide in an improved grounding device such as that last described means for lengthening or shortening the grounding device to compensate for wear of the ground-engaging end thereof.

Other objects and advantages reside in the particular structure of the invention, combination and arrangement of the several parts thereof, and will be readily understood by those skilled in the art upon reference to the attached drawing in connection with the following specification, wherein the invention is shown, described and claimed.

Figure 1:
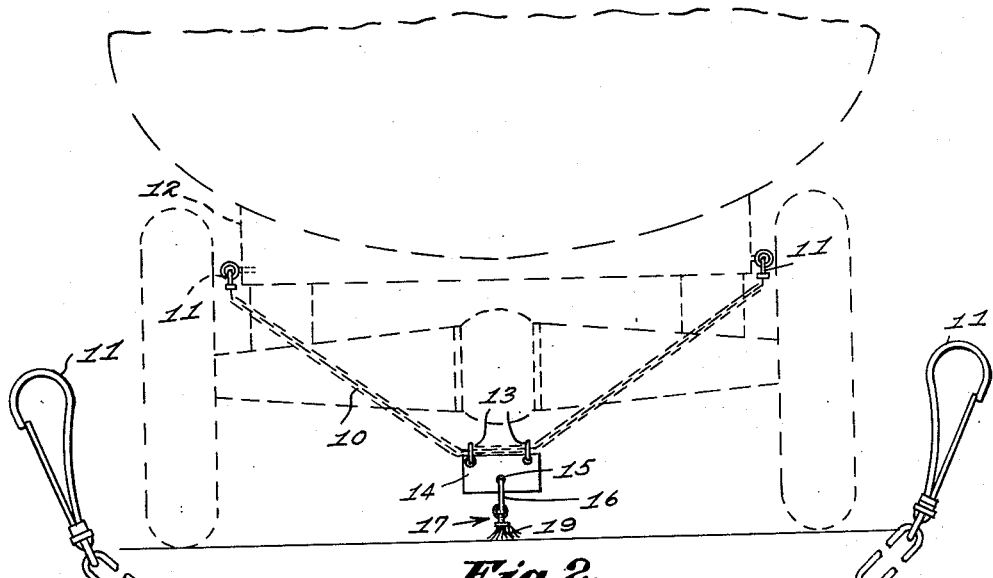
Figure 1 is a diagrammatic end view of a motor vehicle showing a preferred form of the invention applied thereto.
Figure 2:
Figure 2 is a like view on an enlarged scale of the device apart from the vehicle, parts being broken away.
Figure 2:
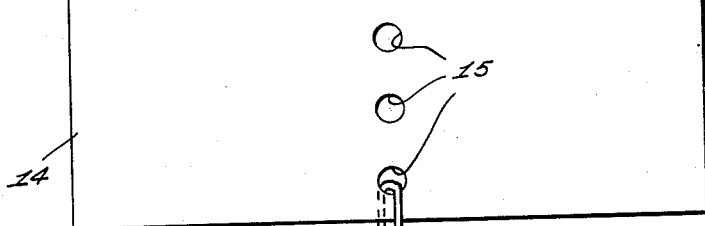
Figure 2:
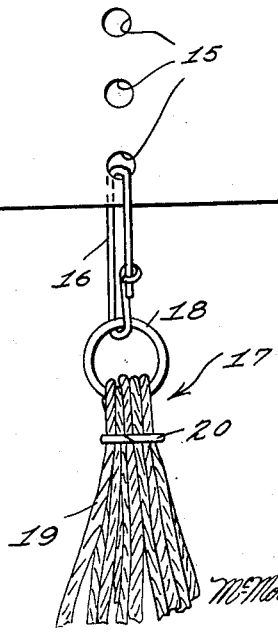

Referring specifically to the drawing, wherein like reference characters have been used throughout the several views to designate like parts, 10 designates any suitable electric current-conducting means of a flexible character, such as a chain, the opposite ends of which are formed with any suitable fastening members, such as the snap hooks 11, for electrically connecting the chain to any suitable side portions of the vehicle frame 12. The bight portion of the chain 10 has electrically connected thereto in any suitable manner, as by means of the split rings 13, a current-conducting plate 14. The plate 14 is formed with a vertically-disposed series of holes or openings 15, whereby to provide means for the connection to the plate of a connector 16. The connector 16 is in the nature of a safety pin and is selectively insertable in any of the holes 15, whereby to readily detachably connect to the plate a grounding conductor 17. The grounding conductor 17 may comprise a metal ring 18 over which is draped a plurality of metal wires or cables 19 secured together adjacent the ring 18 by means of a split ring or link 20.

In operation, the metal wires or cables 19 of the grounding conductor 17 contact the surface of the road to ground the vehicle only when the vehicle is at rest or traveling at speeds below normal. However, when the vehicle is traveling at or above normal speed, the wind generated by the motion of the vehicle engages the plate 14 and swings the same longitudinally of the vehicle so as to elevate the grounding conductor 17 out of contact with the ground. At the same time, as soon as the speed of the vehicle has slowed to a below-normal speed, the grounding conductor will re-engage the grounding surface and discharge any accumulated static electricity in the vehicle prior to such time as the vehicle draws up at a filling station or comes to a full stop. Thus, the fire hazard and personal discomfort inherent in the accumulated static electricity is eliminated.

While I have shown and described what is now considered to be a preferred form of the invention, it is to be understood that the same is susceptible of other forms and expressions. Consequently, I do not limit myself to the precise structure shown and described hereinabove except as hereinafter claimed.

I claim:

1. A static electricity grounding device for a vehicle comprising an elongated flexible conducting element arranged adjacent to the rear end of the vehicle and extending transversely of the vehicle and having its opposite ends secured to the vehicle near the opposite sides thereof, said flexible conducting element being freely swingable and sagging between its ends and having its lowermost portion spaced above the ground, a wide flat plate arranged adjacent to the lowermost portion of the flexible conducting element and connected near its top to the element and extending substantially vertically below the flexible conducting element, the bottom of the plate being freely disposed so that the plate may assume an inclined position when acted upon by the wind as the vehicle travels forwardly for elevating the bottom of the plate, the bottom of the plate being spaced above the ground at all times so that the plate is not subject to wear, the plate being provided with a plurality of vertically spaced apertures, and a ground engaging conductor element including a part connectable with any of the apertures of the plate and extending below the bottom of the plate for engagement with the ground while the plate is substantially vertically disposed.

2. A static electricity grounding device for a vehicle comprising a chain extending transversely of the vehicle and having its opposite ends secured to the vehicle so that the chain hangs below the vehicle and is spaced at all times above the ground, a wide flat plate arranged adjacent to the longitudinal center of the chain at the lowermost portion of the chain, the plate being provided near its top with transversely spaced openings, connecting rings mounted within the openings and secured to links of the chain so that the top of the plate is disposed close to the chain and hingedly connected therewith, the plate extending below the chain for a substantial distance and having its bottom end freely disposed so that the plate may swing to an inclined position when acted upon by the wind as the vehicle travels forwardly for elevating the bottom end of the plate, the plate being provided near its transverse center with a plurality of vertically spaced apertures, a readily detachable connector element for engagement within any of the vertically spaced apertures of the plate and extending below the plate, and a ground engaging conductor secured to the bottom of the readily detachable connector element for contact with the ground when the plate is substantially vertically disposed.

CHARLES BRUMMER.

REFERENCES CITED

The following references are of record in the file of this patent:

UNITED STATES PATENTS

| Number | Name | Date |
|---|---|---|
| 907,104 | Brower | Dec. 15, 1908 |
| 1,394,211 | Morgan | Oct. 18, 1921 |
| 2,083,478 | Simons | June 8, 1937 |
| 2,084,523 | Crawford | June 22, 1937 |
| 2,216,363 | Crawford | Oct. 1, 1940 |
| 2,318,340 | Thacher | May 4, 1943 |

FOREIGN PATENTS

| Number | Country | Date |
|---|---|---|
| 746,925 | France | June 8, 1933 |